May 8, 1951 S. H. FRANKEL 2,552,420
BEVERAGE BREWER
Filed Feb. 1, 1949 2 Sheets-Sheet 1
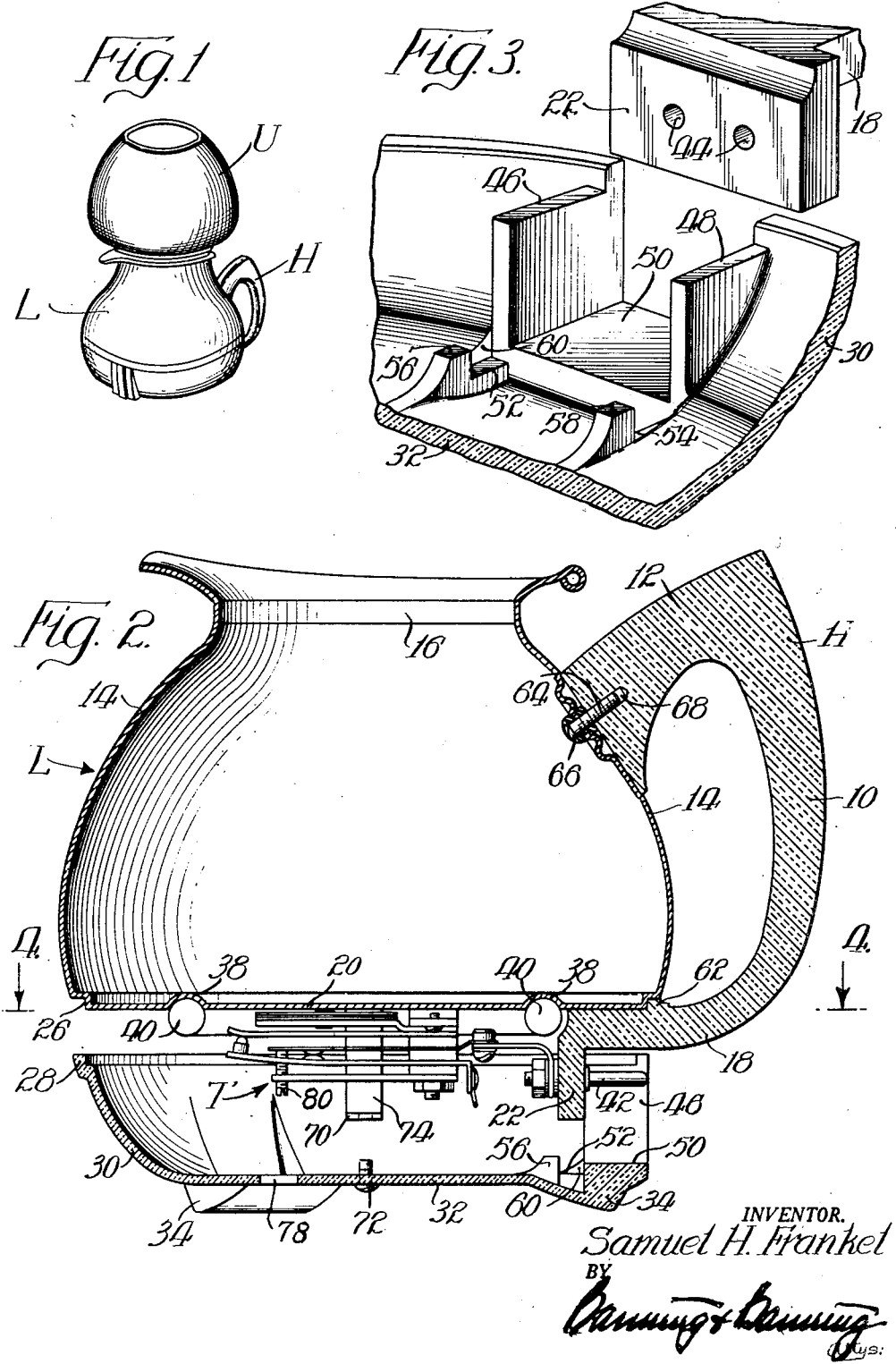
INVENTOR.
Samuel H. Frankel
BY
Canning & Canning May 8, 1951  S. H. FRANKEL  2,552,420
BEVERAGE BREWER Filed Feb. 1, 1949  2 Sheets-Sheet 2

INVENTOR.
Samuel H. Frankel
BY
Attys.

Patented May 8, 1951

2,552,420

UNITED STATES PATENT OFFICE 2,552,420

BEVERAGE BREWER

Samuel H. Frankel, Chicago, Ill., assignor to Cory Corporation, Chicago, Ill., a corporation of Delaware Application February 1, 1949, Serial No. 73,949

6 Claims. (Cl. 219—43)

This invention relates to a beverage brewer of the kind which utilizes upper and lower bowls, the former in the general shape of a funnel and the latter in the general shape of a decanter. More particularly the present improvements are concerned with the lower bowl and with the incorporation therewith of a demountable base and of a demountable handle, the one cooperating with the other in the special manner hereinafter disclosed.

In the illustrated construction the decanter is produced from metal, and below its bottom is provided with a base defining a closed compartment wherein is a heating element together with a thermostatic control means therefor. This base is demountably affixed to the decanter, but normally remains assembled fixedly therewith so as to constitute for all practical purposes an integral part thereof.

For the handling of such a decanter it is important that a relatively cool handle be provided. It is difficult to affix such a handle to the decanter without piercing the walls of the decanter at one or more places. Furthermore, in case that trouble should develop and removal of the handle becomes necessary, this may prove a rather delicate operation which can be undertaken only by a mechanic or one who is equipped with the necessary tools and familiarity with the involved construction.

According to the present invention I provide a handle which is simple and effective for its intended purposes, and one which interlocks readily with the base of the decanter in a manner which requires no tool operation. In its upper region the handle is extended toward the decanter to engage therewith at a point near its top where the decanter may be pierced to receive therethrough a screw which enters into the handle to engage therewith. This screw is advanced into a socket within the handle, threaded for its reception when operated from the inside of the decanter; the mouth of the decanter is, of course, of ample size to permit the fingers to enter thereinto and also to manipulate a small screw driver therein whereby the screw may be tightened in place.

The construction of the handle and its operative connection with the decanter is one which permits the handle to remain relatively cool even when liquid within the decanter is at a boiling temperature. The demountable base provides for the lower end of the handle a fixed anchorage which assures an immovable securement at that point. Should it become necessary to gain access to the interior of the base, a demounting thereof may take place without interference from the handle whose mounting on the decanter remains unimpaired.

These several advantages which inhere in a decanter-base-handle combination as hereinafter set forth may be advantageously embodied in a construction such as is illustrated in the accompanying drawing wherein:

Figure 1 is a view in perspective of a beverage brewer comprising an upper bowl in the form of a funnel and a lower bowl in the form of a decanter having a demountable base and an attached handle to be hereinafter described in detail;

Fig. 2 is a vertical section through the decanter and handle, the base being demounted and separated slightly from the decanter;

Fig. 3 is a fragmentary perspective view looking into the decanter base at the point where walls are provided to establish a seat with which the lower end of the handle, also shown fragmentarily, may be interlocked;

Figure 4:
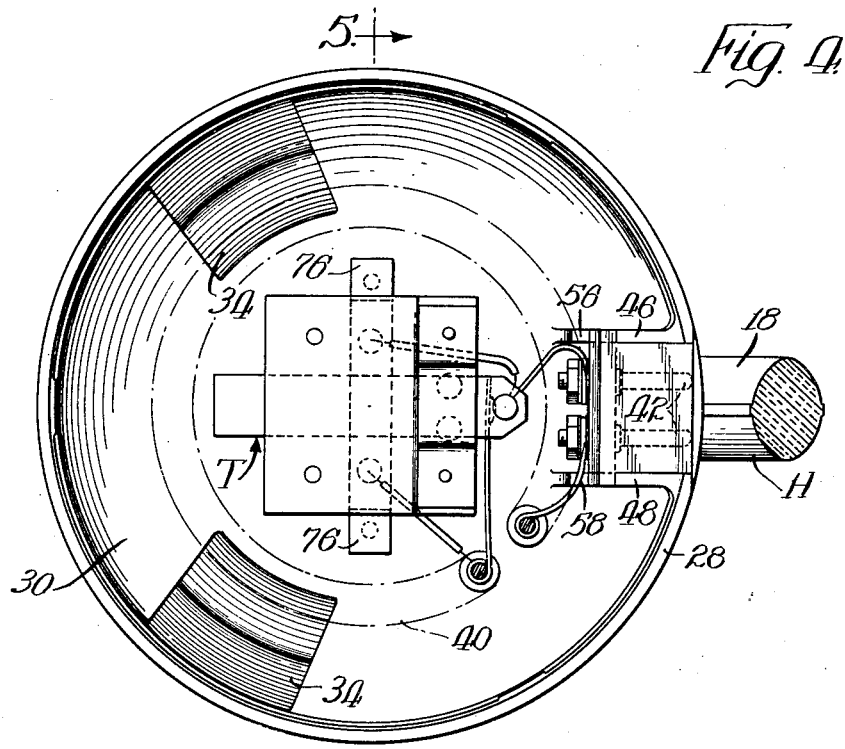
Fig. 4 is a horizontal section, taken on line 4—4 of Fig. 2.

The beverage brewer which is shown in Fig. 1 comprises an upper bowl U and a lower bowl L, the latter in the general form of a decanter. A handle H, desirably of a suitable plastic material, is affixed to the decanter and disposed in a vertical plane upon one side thereof. As shown best in Fig. 2, the form of this handle is such that it comprises a vertical gripping section 10 which is joined at its upper end to a laterally extending head 12 in engagement with the decanter wall 14 at a point relatively close to its neck 16 which is of relatively large diameter. The lower end of the handle is inturned at 18 and extends radially to a point below the decanter bottom 20 where it ends in a downturned block 22.

At the point where the decanter walls and bottom meet there is an annular inset 26 adapted to receive the outset shouldered upper edge 28 of a base which comprises an outwardly inclined circular wall 30 upstanding from a bottom 32. A plurality of feet 34, provided by downwardly extending portions of the bottom 32, furnish a three-point support for the base which may be conveniently produced from a plastic material which is suitable for the purpose.

In the decanter bottom is an upwardly formed circular groove 38 for receiving on its under side a Calrod 40 or other form of heating element which is fixedly secured thereto; a second low heat element which is unimportant to this invention is also mounted adjacent the decanter bottom centrally thereof. A thermostat device T is mounted in the base and interposed in an electrical circuit whereby to control the operation of the two heating elements. The circuit is in electrical connection with a pair of contact posts 42 which are extended through holes 44 in the handle block 22 for removable mounting thereon; the posts are fixedly disposed horizontally within a chamber defined by spaced parallel walls 46 and 48 that are extended inwardly from the side wall 30 of the base (see Fig. 3). A plug (not shown) to which an electrical circuit is carried from a source of energy may be frictionally connected to the two posts 42 whereby to conduct current through the thermostat to one or the other of the heating elements for operation thereof.

The base wall 30 is interrupted for the distance which separates the parallel walls 46 and 48 (see Fig. 3). These two walls upstand from a floor 50 which terminates inwardly flush with the corresponding faces of the walls 46 and 48, and at this point I provide a pair of steps 52 and 54 which extend inwardly to meet with upstanding shoulders 56 and 58. The length of each step which is determined by the spacing of the shoulders from the floor 50 is substantially equal to the thickness of the block 22 at the bottom of the handle. This block is of a width sufficient to extend between the inner faces of the two walls 46 and 48 so as to engage therewith while resting upon the steps 52 and 54 where it is confined by the shoulders 56 and 58 (see Fig. 3). The base wall 30 adjacent the two steps 52 and 54 is configured to provide vertical faces 60 which define the outer limits of these steps and serve to confine the block 22, when seated on the steps, from shifting laterally thereon.

The seat which is provided upon the two steps for the handle block 22 will prevent any movement thereof except in an upward direction. The inwardly extending lower end of the handle occupies the upper part of the space between the walls 46 and 48 so as to substantially engage the decanter bottom 20. A transverse rib 62 at the top of the handle inturn is adapted to lie within the inset 26 of the base thereby maintaining continuity with the outset edge 28 at this point. This rib also serves as a stop to limit radial approach of the handle lower end to the exact point required for the block 22 to enter into this seat.

To complete securement of the handle H to the decanter L a screw 64 is entered through an opening that is provided in the decanter wall 14. The head 66 of this screw lies to the inside of the decanter so as to be manipulatable by a screwdriver. The threaded shank of the screw may be advanced within a threaded socket 68 that is provided in the handle head 12 so that the latter may be tightly drawn against the decanter and there be held in place. When so secured, the handle provides a firm and convenient means whereby the decanter may be lifted and moved about and manipulated in the usual way.

Figure 5:
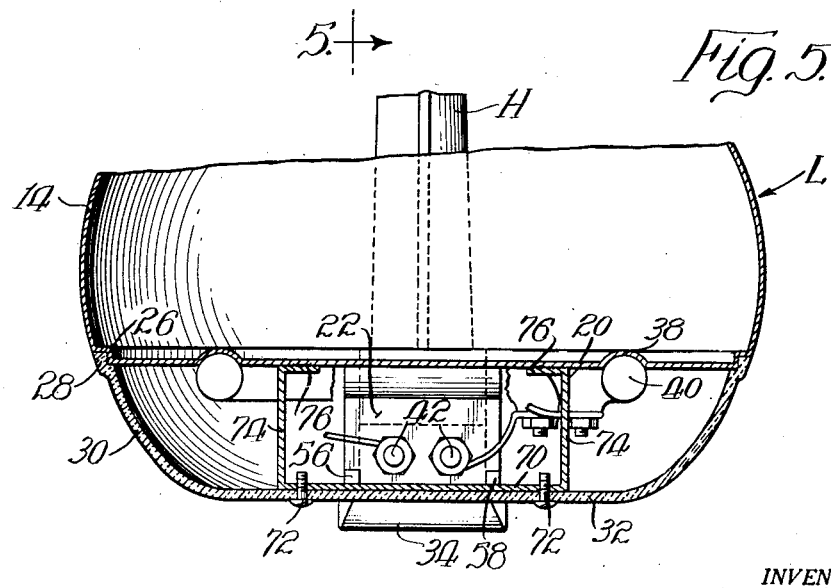
Fig. 5 is a fragmentary vertical section, taken on line 5—5 of Fig. 4.

A strap 70 (see Fig. 5) is extended diametrically of the base along its bottom 32 to which it is releasably connected by screws 72 whose heads are exposed on the under side so as to be available for manipulation. This strap is upturned at two points to provide parallel legs 74 having inturned feet 76 which abut the under side of the decanter bottom 20 to which they are united as by welding. A bridge frame is thereby constituted, extending within the base between the decanter bottom 20 to which it is fixedly secured and the base bottom 32 to which it is releasably connected. Within this frame the thermostat device T (omitted from the showing of Fig. 5) is accommodated without interference, to be supported close to the decanter bottom 20. A hole 78 in the base bottom 32 permits a tool to be inserted therethrough for operative engagement with an adjusting screw 80 by which the action of the thermostat may be regulated. When the base is freed from the bridge frame by removal of the screws 72, it may also separate readily from the handle block 22 when moved axially away from the decanter, as suggested in Fig. 2.

It will be noted that the walls 46 and 48 define a lateral passageway, open at the top, which leads from the interior of the chambered base to the outside thereof. This passageway is closed by the block 22 when entered into the seat provided by the steps 53 and 54 which are located at the inner end of the passageway. When closed, as just noted, the passageway will be occupied by the contact posts 42 which remain accessible for frictional engagement by the usual resilient jaws which are incorporated into a plug that is in electrical connection with a current source. These posts are further protected by the lower inturned handle end 18 which extends thereabove. I have thereby provided a very simple and effective mounting for the contact posts and one in which they are adequately protected at all times.

When the base is disconnected for separation from the decanter, it is moved away therefrom through an axial path for a distance sufficient to permit the handle block 22 to clear the walls 46 and 48. There are no wire connections between the base and the contact posts 42 or the thermostat T to require disconnection as an incident to complete removal of the base from the decanter.

In the very rare event that a new handle H is to be substituted for the one previously affixed to the decanter, it is necessary only that the base be separated therefrom for a distance sufficient to permit disconnection of the one handle and installation of the other; when this is done, the base is then refitted in place and connected to the bridge frame for securement to the decanter. It will be observed that the number of parts involved in the present construction is few so that the operation of assembly or disassembly may be performed quickly and with the simplest of tools.

I claim:

1. In a beverage brewer, a decanter, a handle extending vertically along one side of the decanter and joined therewith at the upper end only and having its lower end inturned and provided with a depending block, a chambered base fitted to the bottom of the decanter and provided below the lower inturned portion of the handle with a radial passageway receiving said inturned portion of the handle and having spaced vertical side walls and closed at its inner end by said block, said base being provided at the lower end of the radial passageway with a seat receiving the lower end of the block and consisting of laterally spaced steps and upstanding shoulders, said steps supporting the closure block and the latter being restrained against inward and outward horizontal movement by said walls and said shoulders and said seat being provided with side faces arranged to restrain the block against lateral movement, and means for detachably securing the base to the decanter, said means holding the block against vertical movement and said base, when released by said securing means, being movable axially away from the decanter.

2. In a beverage brewer a decanter, a handle extending vertically along one side of the decanter and joined therewith at the upper end only and having its lower end inturned and provided with a depending block, a chambered base fitted to the bottom of the decanter and provided below the lower inturned portion of the handle with a radial passageway receiving said inturned portion of the handle and having spaced vertical side walls and closed at its inner end by said block, said base being provided at the lower end of the radial passageway with a seat receiving the lower end of the block and consisting of laterally spaced steps and upstanding shoulders, said steps supporting the closure block and the latter being restrained against inward and outward horizontal movement by said walls and said shoulders and said seat being provided with side faces arranged to restrain the block against lateral movement, a bridge frame fitted against the base and having legs fixed to the decanter, and a fastening device securing the bridge member to the base and detachably connecting the latter with the decanter.

3. In a beverage brewer, a decanter, a handle extending vertically along one side of the decanter and joined therewith at the upper end only and having its lower end inturned and forming a horizontal extension located wholly beneath the decanter and provided at its terminal portion with a depending block, a chambered base fitted to the bottom of the decanter and having thin walls and a bottom formed integral with and connecting the walls, said base being provided at one side with a radial passageway extending from the exterior to the interior thereof and having spaced vertical side walls and receiving the extension of the handle and closed at its inner end by said block, said base being provided below the bottom of the radial passageway with a seat receiving the lower end of the block and provided with means for restraining the block against inward, outward and lateral horizontal movement, and means for detachably securing the base to the decanter.

4. In a beverage brewer, a decanter, a handle extending vertically along one side of the decanter and joined therewith at the upper end only and having its lower end inturned and forming a horizontal extension located wholly beneath the decanter and provided at its terminal portion with a depending block, a chambered base fitted to the bottom of the decanter and having thin walls and a bottom formed integral with and connecting the walls, said base being provided at one side with a radial passageway extending from the exterior to the interior thereof and having spaced vertical side walls and receiving the extension of the handle and closed at its inner end by said block, said base being provided below the bottom of the radial passageway with a seat receiving the lower end of the block and provided with means for restraining the block against inward, outward and lateral horizontal movement, and means for detachably securing the base to the decanter, including a member secured to the bottom of the decanter and a fastening device piercing the bottom of the base and engaging said member, the means for detachably securing the base to the decanter also holding the block against vertical movement and said base, when released from said member, being movable axially away from the decanter.

5. In a beverage brewer, a decanter having an inset at the bottom, a handle extending vertically along one side of the decanter and joined therewith at the upper end only and provided at its lower end with a horizontal extension located wholly beneath the decanter and extending inwardly of the bottom thereof from said inset and provided at its upper face adjacent said inset with a shoulder engaging the same, said horizontal handle extension being provided at its terminal portion with a depending block, a chambered base fitted to the bottom of the decanter and provided at one side at the inturned portion of the handle with a radial passageway extending from the exterior to the interior of the base and provided with side walls and receiving said handle extension and closed at its inner end by said block which extends substantially from the top to the bottom of said base, and means for detachably securing the base to the decanter.

6. A beverage brewer including a decanter, a handle extending vertically along one side of the decanter and joined therewith at its upper end and having at its lower end a horizontal extension located wholly beneath the bottom of the decanter and provided at its terminal portion with a depending block, a chambered base fitted to the bottom of the decanter and provided at one side adjacent the lower end of the handle with a radial passageway extending from the exterior to the interior of the base and having spaced vertical side walls and receiving the extension of the handle and closed at its inner end by said block, means for detachably securing the base to the decanter, a heating element secured to the bottom of the decanter exteriorly thereof, contact posts extending through said depending block and having their outer portions located within said radial passageway, and electrical connections connecting the inner ends of the contact posts with the heating element, said heating element, contact posts and electrical connections being removable as a unit from the base when the latter is detached from the decanter.

SAMUEL H. FRANKEL.

REFERENCES CITED

The following references are of record in the file of this patent:

UNITED STATES PATENTS

| Number | Name | Date |
|---|---|---|
| 2,089,521 | Wolcott | Aug. 10, 1937 |
| 2,312,555 | Jepson | Mar. 2, 1943 |